US005921347A

United States Patent [19]

Rodriguez et al.

[11] Patent Number: 5,921,347

[45] Date of Patent: Jul. 13, 1999

[54] FOLDING SAW HORSE SYSTEM

[76] Inventors: Oswaldo Rodriguez; Joseph H. Davis, both of 1951 Indiana Ave, Kenner, La. 70062

[21] Appl. No.: 08/915,749

[22] Filed: Aug. 21, 1997

[51] Int. Cl.[6] .......... F16M 11/00

[52] U.S. Cl. .......... 182/186.2; 182/153

[58] Field of Search .......... 182/186.2, 186.1, 182/186.4, 225, 153

[56] References Cited

U.S. PATENT DOCUMENTS

| | | | |
|---|---|---|---|
| 1,982,061 | 11/1934 | Marlowe | 182/186.2 |
| 2,158,939 | 5/1939 | Hussey . | |
| 2,793,916 | 5/1957 | Woods | 182/186.2 |
| 3,139,951 | 7/1964 | Clayton | 182/186.2 |
| 3,289,789 | 12/1966 | Larson | 182/186.2 |
| 4,570,752 | 2/1986 | Chapman | 182/186.2 |

FOREIGN PATENT DOCUMENTS

| | | | |
|---|---|---|---|
| 29995 | 7/1922 | Denmark | 182/182.1 |

*Primary Examiner*—Alvin Chin-Shue

[57] ABSTRACT

A new Folding Saw Horse System for facilitating a portable lightweight work aide which allows the user to adjust the work area height, and for providing a compact storage design which is sturdy and stable when expanded. The inventive device includes an elongated support beam, a secured pair of legs secured to one side of the elongated support beam and a folding pair of legs pivotally attached to the secured pair of legs and engaging the elongated support beam on the side opposite of the secured pair of legs when in the expanded position.

1 Claim, 3 Drawing Sheets

FOLDING SAW HORSE SYSTEM

BACKGROUND OF THE INVENTION

1. Field of the Invention

The present invention relates to Saw Horse Devices and more particularly pertains to a new Folding Saw Horse System for facilitating a portable lightweight work aide which allows the user to adjust the work area height, and for providing a compact storage design which is sturdy and stable when expanded.

2. Description of the Prior Art

The use of Saw Horse Devices is known in the prior art. More specifically, Saw Horse Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Saw Horse Devices include U.S. Pat. No. 4,771,863; U.S. Pat. No. 4,771,319; U.S. Design Pat. No. 274,365; U.S. Pat. No. 4,245,718; U.S. Pat. No. 4,763,757 and U.S. Pat. No. 4,570,752.

While these devices fulfill their respective, particular objectives and requirements, the aforementioned patents do not disclose a new Folding Saw Horse System. The inventive device includes an elongated support beam, a secured pair of legs secured to one side of the elongated support beam and a folding pair of legs pivotally attached to the secured pair of legs and engaging the elongated support beam on the side opposite of the secured pair of legs when in the expanded position.

In these respects, the Folding Saw Horse System according to the present invention substantially departs from the conventional concepts and designs of the prior art, and in so doing provides an apparatus primarily developed for the purpose of facilitating a portable lightweight work aide which allows the user to adjust the work area height, and for providing a compact storage design which is sturdy and stable when expanded.

SUMMARY OF THE INVENTION

In view of the foregoing disadvantages inherent in the known types of Saw Horse Devices now present in the prior art, the present invention provides a new Folding Saw Horse System construction wherein the same can be utilized for facilitating a portable lightweight work aide which allows the user to adjust the work area height, and for providing a compact storage design which is sturdy and stable when expanded.

The general purpose of the present invention, which will be described subsequently in greater detail, is to provide a new Folding Saw Horse System apparatus and method which has many of the advantages of the Saw Horse Devices mentioned heretofore and many novel features that result in a new Folding Saw Horse System which is not anticipated, rendered obvious, suggested, or even implied by any of the prior art Saw Horse Devices, either alone or in any combination thereof.

To attain this, the present invention generally comprises an elongated support beam, a secured pair of legs secured to one side of the elongated support beam and a folding pair of legs pivotally attached to the secured pair of legs and engaging the elongated support beam on the side opposite of the secured pair of legs when in the expanded position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Folding Saw Horse System apparatus and method which has many of the advantages of the Saw Horse Devices mentioned heretofore and many novel features that result in a new Folding Saw Horse System which is not anticipated, rendered obvious, suggested, or even implied by any of the prior art Saw Horse Devices, either alone or in any combination thereof.

It is another object of the present invention to provide a new Folding Saw Horse System which may be easily and efficiently manufactured and marketed.

It is a further object of the present invention to provide a new Folding Saw Horse System which is of a durable and reliable construction.

An even further object of the present invention is to provide a new Folding Saw Horse System which is susceptible of a low cost of manufacture with regard to both materials and labor, and which accordingly is then susceptible of low prices of sale to the consuming public, thereby making such Folding Saw Horse System economically available to the buying public.

Still yet another object of the present invention is to provide a new Folding Saw Horse System which provides in the apparatuses and methods of the prior art some of the advantages thereof, while simultaneously overcoming some of the disadvantages normally associated therewith.

Still another object of the present invention is to provide a new Folding Saw Horse System for facilitating a portable lightweight work aide which allows the user to adjust the work area height, and for providing a compact storage design which is sturdy and stable when expanded.

Yet another object of the present invention is to provide a new Folding Saw Horse System which includes an elongated support beam, a secured pair of legs secured to one side of the elongated support beam and a folding pair of legs pivotally attached to the secured pair of legs and engaging the elongated support beam on the side opposite of the secured pair of legs when in the expanded position.

Still yet another object of the present invention is to provide a new Folding Saw Horse System that is compact in storage, lightweight, easy to transport, sturdy, stable and portable.

Even still another object of the present invention is to provide a new Folding Saw Horse System that provides an adjustable work space for the user during various activities while maintaining stability.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
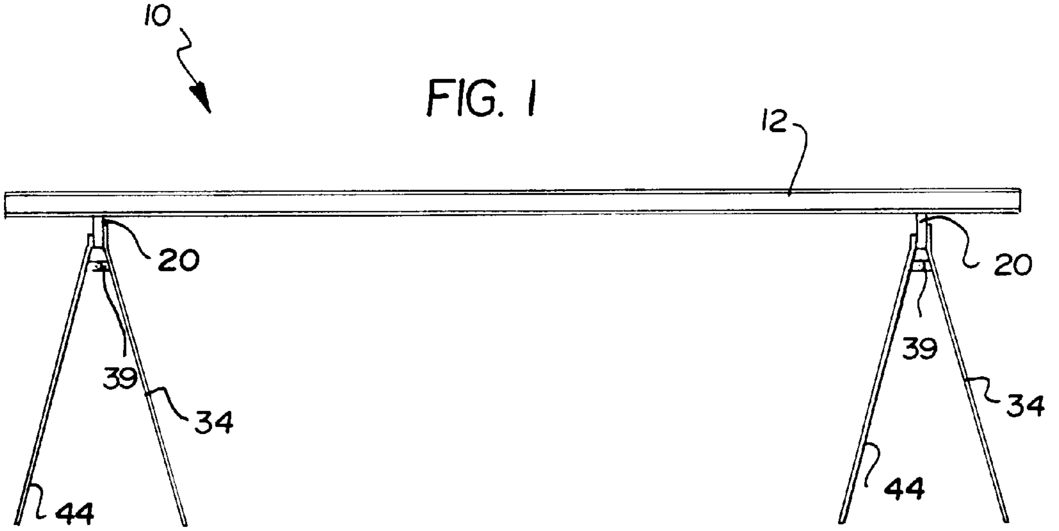
FIG. 1 is a side view of a new Folding Saw Horse System according to the present invention with a conventional ladder in the top position.
Figure 2:
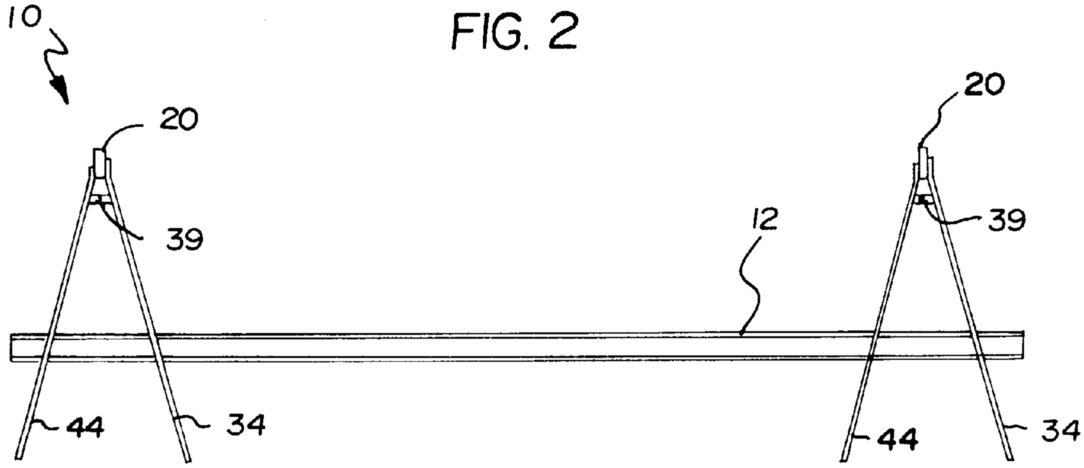
FIG. 2 is a side view of a new Folding Saw Horse System according to the present invention with a conventional ladder in the bottom position.

With reference now to the drawings, and in particular to FIGS. 1 through 6 thereof, a new Folding Saw Horse System embodying the principles and concepts of the present invention and generally designated by the reference numeral 10 will be described.

More specifically, it will be noted that the Folding Saw Horse System 10 comprises an elongated support beam 20 where the height is substantially larger than the width, a secured pair of legs 30 fastened to one side of the elongated support beam 20, and a folding pair of legs 40 pivotally secured to the secured pair of legs 30 and engaging the elongated support beam 20 on the side opposite of the secured pair of legs 30 when in the expanded position.

Figure 3:
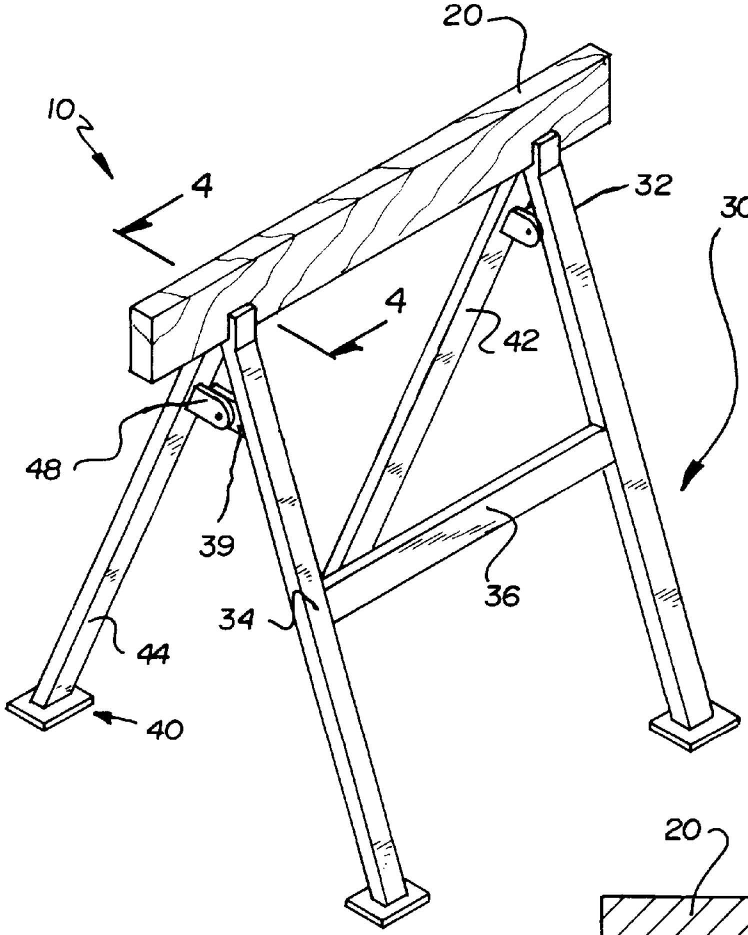
FIG. 3 is an upper side perspective view of the present invention disclosing the secured pair of legs in relation to the folding pair of legs and the elongated support beam.
Figure 4:
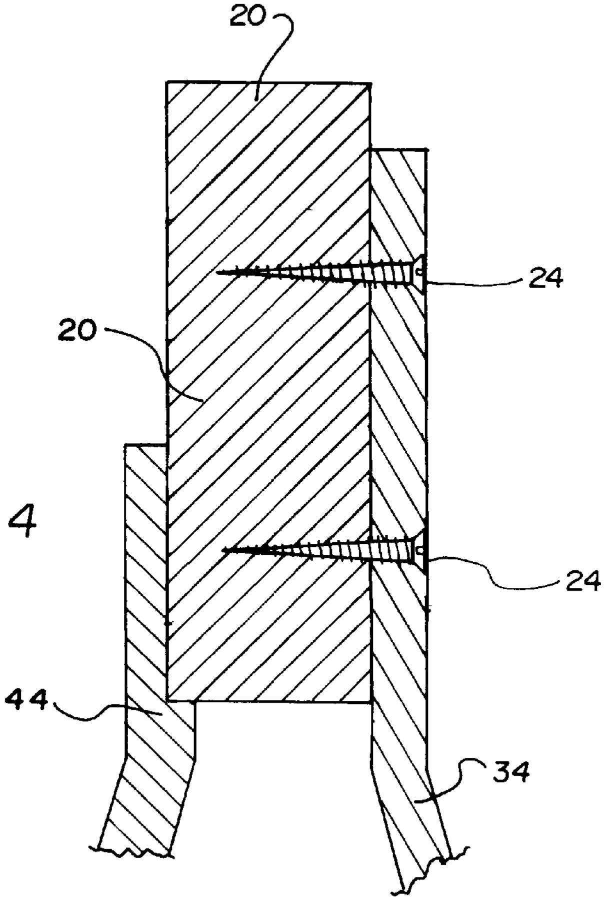
FIG. 4 is a cross sectional view taken along line 4—4 of FIG. 3 disclosing the wood screw projecting into the elongated support beam.

The secured pair of legs 30 include a first secured leg 32 projecting from the ground at a slight angle toward the elongated support beam and then projecting vertically near the elongated support beam 20. A pair of wood screws 24 project through the first secured leg 32 into the elongated support beam 20 as best shown in FIG. 4 of the drawings. A second secured leg 34 projects from the ground at a slight angle toward the end of the elongated support beam opposite of the first secured leg 32 and then projects vertically near the elongated support beam. Another pair of wood screws 24 project through the second secured leg 34 into the elongated support beam 20. A first cross member 36 is secured at one end to the lower portion of the first secured leg 32 projecting parallel to the elongated support beam 20 to engage the second secured leg 34 as best shown in FIG. 3 of the drawings. A pivoting member 39 is secured to the first secured leg 32 projecting toward the folding pair of legs 40. Another pivoting member 39 is secured to the second secured leg 34 projecting toward the folding pair of legs 40.

As shown in FIGS. 1 through 4 of the drawings, the folding pair of legs 40 have a first folding leg 42 having an upper portion projecting from the ground at a slight angle toward the elongated support beam 20 and then projecting vertically near the elongated support beam 20. A second folding leg 44 having an upper portion is preferably projecting from the ground at a slight angle toward the end of the elongated support beam opposite of the first folding leg 42 and At then projecting vertically near the elongated support beam 20. The upper portion of the first folding leg 42 and the upper portion of the second folding leg 44 have a lip 48 for removably engaging the bottom surface of the elongated support beam 20 for supporting the elongated support beam 20 and an unnumbered load. Another pivoting member 39 is secured to the first folding leg 42 projecting toward the secured pair of legs 30 pivotally engaging the pivoting member 39 secured to the first secured leg 32. Another pivoting member 39 is secured to the second folding leg 44 projecting toward the secured pair of legs 30 pivotally engaging the pivoting member 39 secured to the second secured leg 34. Preferably, the elongated support beam 20 is constructed from wood and the legs are constructed from solid steel. Preferably, the length of the elongated support beam 20 is approximately 36" and the width is approximately 2" and the height is approximately 6" providing maximum strength with respect to weight.

Figure 5:
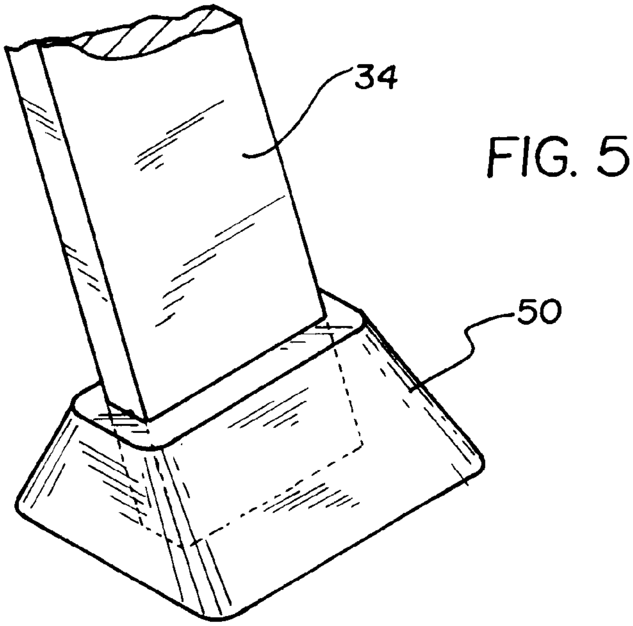
FIG. 5 is an alternative embodiment of the present invention comprising a rubber foot secured to the bottom of the legs.

As disclosed in FIG. 5 of the drawings, another embodiment of the present invention includes is where the secured pair of legs 30 and the folding pair of legs 40 include a rubber foot 50 secured to the bottom of each leg.

Figure 6:
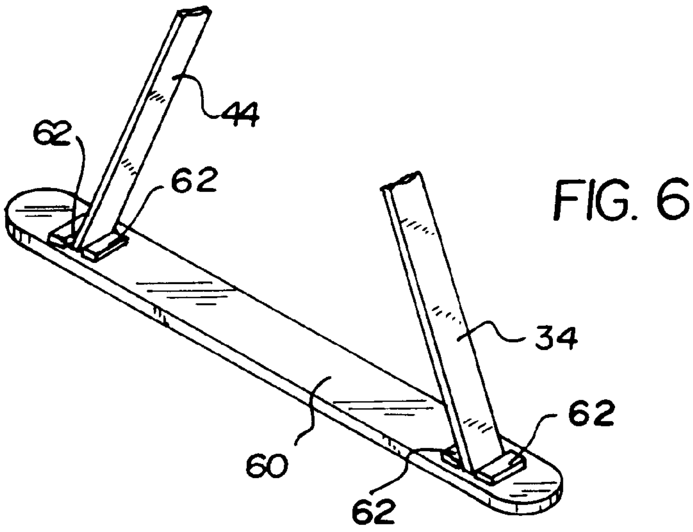
FIG. 6 is an another alternative embodiment of the present invention comprising a flat support bar extending between the secured pair of legs and the folding pair of legs.

As disclosed in FIG. 6 of the drawings, even another embodiment of the present invention includes a flat support bar 60 extending beneath the first folding leg 42 and the first secured leg 32 where the legs are surrounded by a plurality of stoppers 62, and another flat support bar 60 extending beneath the second folding leg 44 and the second secured leg 34 where the legs are surrounded by a plurality of stoppers 62.

In use, the user pivots the folding pair of legs 40 so as to put them in the expanded position. The user then may place a structure, such as a conventional ladder 12, between a pair of the present inventions. The user may then stand on the conventional ladder 12. The user may also lower the height by positioning the conventional ladder 12 over the first and second cross members 36 and 46 of the pair. When the user is finished utilizing the present invention, he simply folds the folding pair of legs 40 in relation to the secured pair of legs 30 forming a flat compact structure which may be stored easily in most areas.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A folding saw horse system of comprising:

an elongated support beam having a bottom surface wherein the height is substantially larger than the width;

a secured pair of legs fastened to one side of the elongated support beam;

a folding pair of legs pivotally secured to the secured pair of legs and engaging the elongated support beam on the side opposite of the secured pair of legs when in an expanded position;

wherein the secured pair of legs includes:

a first secured leg projecting from the ground at a slight angle toward the elongated support beam and then projecting vertically near the elongated support beam wherein a pair of wood screws project through said first secured leg into said elongated support beam;

a second secured leg projecting from the ground at a slight angle toward the end of the elongated support beam opposite of the first secured leg and then projecting vertically near the elongated support beam wherein another pair of wood screws project through said second secured leg into said elongated support beam;

a first cross member secured at one end to the lower portion of the first secured leg projecting parallel to the elongated support beam to engage the second secured leg; and a pivoting member secured to the first secured leg projecting toward the folding pair of legs and another pivoting member secured to the second secured leg projecting toward the folding pair of legs;

wherein the folding pair of legs includes:

a first folding leg having an upper portion projecting from the ground at a slight angle toward the elongated support beam and then projecting vertically near the elongated support beam;

a second folding leg having an upper portion projecting from the ground at a slight angle toward the end of the elongated support beam opposite of the first folding leg and then projecting vertically near the elongated support beam;

said upper portion of said first folding leg and said upper portion of said second folding leg including a lip defined by a recess formed in the associated folding leg for removably engaging said bottom surface of said elongated support beam for supporting said elongated support beam and a load; and another pivoting member secured to the first folding leg projecting toward the secured pair of legs pivotally engaging the pivoting member secured to the first secured leg, and another pivoting member secured to the second folding leg projecting toward the secured pair of legs pivotally engaging the pivoting member secured to the second secured leg;

wherein a flat support bar extends beneath the first folding leg and the first secured leg where the legs are each flanked by a pair of stoppers each defined by a rectangular strip, and another flat support bar extending beneath the second folding leg and the second secured leg where the legs are each flanked by a pair of stoppers each defined by a rectangular strip, wherein the stoppers define a pair of laterally extending slots positioned in perpendicular relationship with flat support bar and further define open tops;

wherein the elongated support beam is constructed from wood and the legs are constructed from solid steel;

wherein the length of the elongated support beam is approximately 36" and the width is approximately 2" and the height is approximately 6" providing maximum strength with respect to weight.

* * * * *